US011750415B1

(12) United States Patent
Zaltsman et al.

(10) Patent No.: US 11,750,415 B1
(45) Date of Patent: Sep. 5, 2023

(54) REMOTE PHY NARROWBAND DIGITAL RETURN (NDR)

(71) Applicant: Harmonic, Inc., San Jose, CA (US)

(72) Inventors: Ariel Zaltsman, Raanana (IL); Adi Bonen, Belle Mead, NJ (US); Boris Brun, Haifa (IL)

(73) Assignee: Harmonic, Inc., San Jose, CA (US)

( * ) Notice: Subject to any disclaimer, the term of this patent is extended or adjusted under 35 U.S.C. 154(b) by 455 days.

(21) Appl. No.: 16/747,188

(22) Filed: Jan. 20, 2020

Related U.S. Application Data (60) Provisional application No. 62/794,847, filed on Jan. 21, 2019.

(51) Int. Cl.
*H04L 12/28* (2006.01)
*H04L 12/46* (2006.01)

(52) U.S. Cl.
CPC ...... *H04L 12/2869* (2013.01); *H04L 12/2861* (2013.01); *H04L 12/4633* (2013.01)

(58) Field of Classification Search
CPC ............. H04L 12/2869; H04L 12/2861; H04L 12/4633; H04B 3/46; H04N 21/2402; H04N 21/2408; H04N 21/4424; H04N 21/44245; H04N 21/6118; H04N 21/615; H04N 21/6168; H04W 84/12; H04W 8/005; H04W 88/06; G06F 15/16
See application file for complete search history.

(56) References Cited

U.S. PATENT DOCUMENTS

| | | | | |
|---|---|---|---|---|
| 5,263,050 A * | 11/1993 | Sutterlin | ............ | H04B 1/70712 375/142 |
| 5,452,344 A * | 9/1995 | Larson | ..................... | G07F 9/026 340/12.33 |
| 6,523,177 B1 * | 2/2003 | Brown | ................ | H04J 14/0226 348/E7.07 |
| 6,647,028 B1 * | 11/2003 | Lancon | ................. | H04J 3/0626 370/216 |
| 7,002,995 B2 * | 2/2006 | Chow | ................. | H04L 12/2801 370/485 |
| 10,027,592 B1 * | 7/2018 | Guo | ....................... | H04W 28/02 |
| 10,404,585 B1 * | 9/2019 | Bonen | ..................... | H04L 45/70 |
| 10,616,622 B2 * | 4/2020 | Zinevich | ................. | H04L 43/50 |
| 2005/0128955 A1 * | 6/2005 | Chang | ....................... | H04L 1/20 370/252 |
| 2006/0171378 A1 * | 8/2006 | Harris | ............... | H04L 29/06027 370/352 |
| 2007/0183403 A1 * | 8/2007 | Somers | ............... | H04M 3/2281 370/352 |

(Continued)

*Primary Examiner* — Stephen M D Agosta
(74) *Attorney, Agent, or Firm* — BROKAW PATENT LAW PC; Christopher J. Brokaw (57) ABSTRACT

A single hardware device ("unified NDR core") that supports a narrowband digital return (NDR) channel for a plurality of remote PHY devices. The unified NDR core may be located within a cable headend. The unified NDR core comprises a single digital-to-analog converter (DAC) which converts digital payloads carried by digital packets received from the plurality of Remote PHY devices into a RF signal. The unified NDR core further comprises a transmitter for sending the RF signal to an Out-of-Band (OOB) Termination System. The unified NDR core supports a plurality of narrowband digital return (NDR) channels for the plurality of remote PHY devices.

27 Claims, 12 Drawing Sheets

(56) References Cited

U.S. PATENT DOCUMENTS

| | | | | |
|---|---|---|---|---|
| 2010/0054512 A1* | 3/2010 | Solum | .................... | H04R 25/30 |
| | | | | 381/315 |
| 2012/0023522 A1* | 1/2012 | Anderson | .......... | H04N 21/2221 |
| | | | | 725/35 |
| 2013/0125194 A1* | 5/2013 | Finkelstein | ......... | H04L 12/2801 |
| | | | | 725/129 |
| 2013/0314741 A1* | 11/2013 | Chen | .................... | H04N 1/0022 |
| | | | | 358/1.15 |
| 2015/0222449 A1* | 8/2015 | Salinger | .............. | H04L 12/2801 |
| | | | | 370/419 |
| 2015/0295669 A1* | 10/2015 | Chapman | ............ | H04L 12/2801 |
| | | | | 370/503 |
| 2017/0142493 A1* | 5/2017 | Howe | ................... | H04N 21/6118 |
| 2017/0315744 A1* | 11/2017 | Kurian | .................. | G06F 21/606 |
| 2017/0353750 A1* | 12/2017 | Gotwals | ............. | H04N 21/2408 |
| 2020/0204843 A1* | 6/2020 | Zinevich | ................. | H04L 43/04 |
| 2020/0221148 A1* | 7/2020 | Zinevich | ................. | H04L 43/04 |

\* cited by examiner

REMOTE PHY NARROWBAND DIGITAL RETURN (NDR)

CLAIM OF PRIORITY

The present application claims priority to U.S. Provisional Patent Application No. 62/794,847, entitled "Remote PHY Narrowband Digital Return," filed Jan. 21, 2019, the disclosure of which is hereby incorporated by reference for all purposes in its entirety as if fully set forth herein.

FIELD OF THE INVENTION

Embodiments of the invention generally relate to a single hardware device that supports a narrowband digital return (NDR) channel for a plurality of remote PHY devices.

BACKGROUND

A Converged Cable Access Platform (CCAP) is an industry standard platform for transmitting video data and voice content. The CCAP platform is led by CableLabs of Sunnyvale, Calif.

CableLabs has publicly issued a Remote PHY family of specifications, known as the MHAv2 specifications (Modular Headend Architecture version 2). The MHAv2 specifications describe how a CCAP platform may be separated into two components, (1) a CCAP Core located at a cable headend, and (2) a Remote PHY device (RPD), which is typically located outdoors. An RPD may be located, for example, at the junction of the fiber and coax plants in an optical node serving as a Remote PHY Node (RPN).

Figure 1:
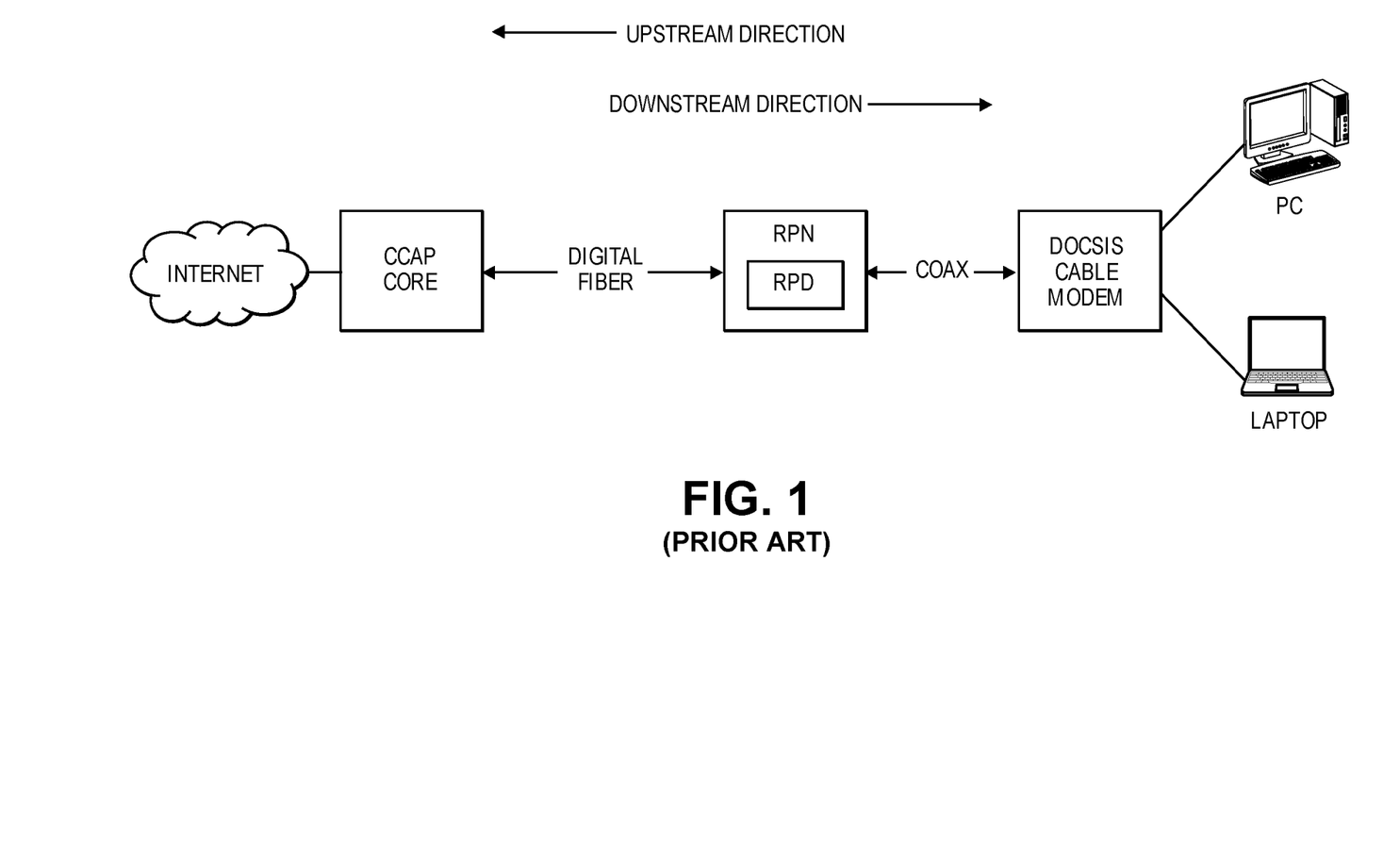
FIG. 1 is a block diagram of a CCAP platform which includes an RPD situated inside an RPN in accordance with the MHAv2 specifications of the prior art.

FIG. 1 is a block diagram of an exemplary CCAP platform which includes an RPD situated inside an RPN in accordance with the MHAv2 specifications of the prior art. The RPD of FIG. 1 communicates over a digital fiber network using Ethernet/IP to other networking devices "upstream" (i.e., in the direction from the RPD to the CCAP Core). In the "downstream" direction (i.e., in the direction from the RPD to a Data Over Cable Service Interface Specification (DOCSIS) cable modem), the RPD modulates information streams (data, video, voice, etc.) into a radio frequency (RF) signals that are carried over coaxial cables, and demodulates similar such streams from RF signals.

Figure 2:
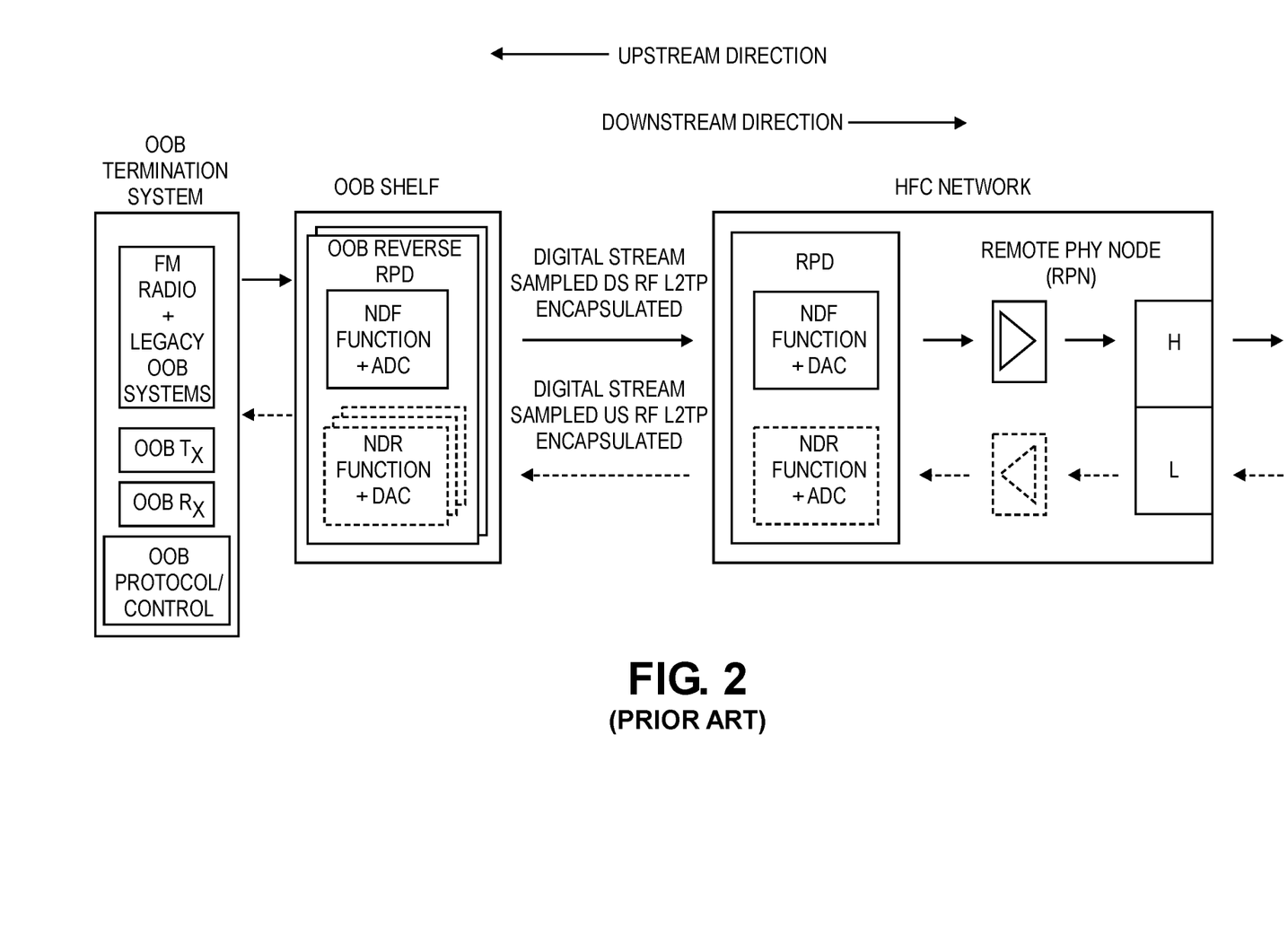
FIG. 2 depicts the basic structure of an Out-of-Band (OOB) system in accordance with the prior art.

In addition to its core responsibilities, a RPD must also support Out-Of-Band (OOB) signaling. OOB signaling refers to signals operating within the defined DOCSIS upstream and downstream spectrum that are not part of the DOCSIS specification, which is the industry-wide standard for transmitting data for various uses over a Cable Television (CATV) system. FIG. 2 depicts the basic structure of an Out-Of-Band (OOB) system in accordance with the prior art. In the upstream direction, an OOB modulator device sends an analog signal into the CCAP Core. The CCAP Core samples the signal, packetizes the signal samples, and sends the signal samples through an internal IP network to the RPD. The RPD then converts the digitized spectrum back into the analog domain and sends them to the OOB customer premises equipment (CPE). This process is called 'Narrowband Digital Forward (NDF),' and the defined contiguous portion of the DOCSIS spectrum, within which the NDF OOB signals reside, is referred to herein as a NDF channel.

Likewise, in the reverse direction, the OOB CPE equipment generates an analog signal which is then sampled by the RPD. The RPD packs the samples into packets and sends those packets through the internal IP network to the CCAP Core. The CCAP Core then converts the digitized spectrum back into an analog signal, which is sent out to an OOB demodulator (identified as an OOB Rx in FIG. 2). This process is called 'Narrowband Digital Return (NDR),' and the defined contiguous portion of DOCSIS spectrum, within which the NDR OOB signals reside, is referred to herein as a NDR channel.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a single hardware device to support a narrowband digital return (NDR) channel for a plurality of remote PHY devices are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Out-of-Band (OOB) Return Paths in a Cable Network

In legacy cable networks, Out-of-Band (OOB) signals, both in upstream (return path) and in downstream (forward path) directions, are combined in a RF network at the hybrid fiber-coaxial (HFC) network side and at the Headend/Hub side. To illustrate, consider FIG. 3, which is a diagram of a typical Out-of-Band (OOB) return path in accordance with the prior art. In a hybrid fiber/coaxial (HFC) analog network 300, one or many OOB transmission sources 302 (for example, a television set or a computer at a customer premises) each supply an analog OOB signal that are combined and input into optical node 304. Optical node 304 converts the combined analog signals into a digital signal that is carried by light, which is then transmitted by optical node 304 through fiber cables into Headend/Hub (H/H) 310. At H/H 310, the digital signal carried by light is converted back to a Radio Frequency (RF) signal at OOB receiver (Rx) module 320.

Figure 3:
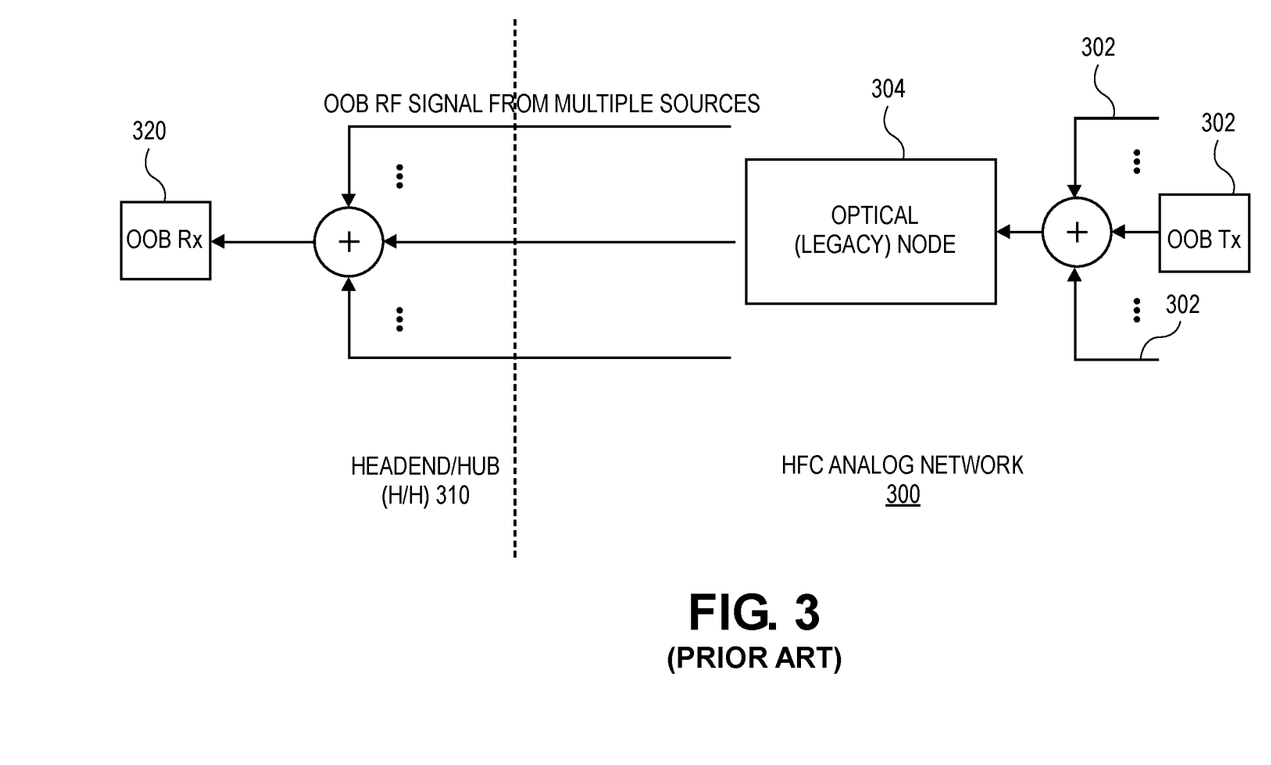
FIG. 3 is a diagram of a typical Out-of-Band (OOB) return path in accordance with the prior art.

As shown in FIG. 3, OOB signals from multiple sources are combined and input to OOB Rx module 320. Thus, in addition to the OOB signals sent from optical node 304, H/H 310 will receive OOB signals from many other sources, i.e., from many other optical nodes (other than optical node 304) that each propagates OOB signals originating from many other OOB transmission sources.

In accordance with a typical OOB protocol employed by the legacy Out-of-Band (OOB) return path of FIG. 3, H/H 310 controls the transmission of OOB signals sent by remote elements to prevent their transmission from colliding when received at H/H 310. Examples of such transmissions controlled in this manner include telemetry data, control signals for network elements, and alignment carriers.

Figure 4:
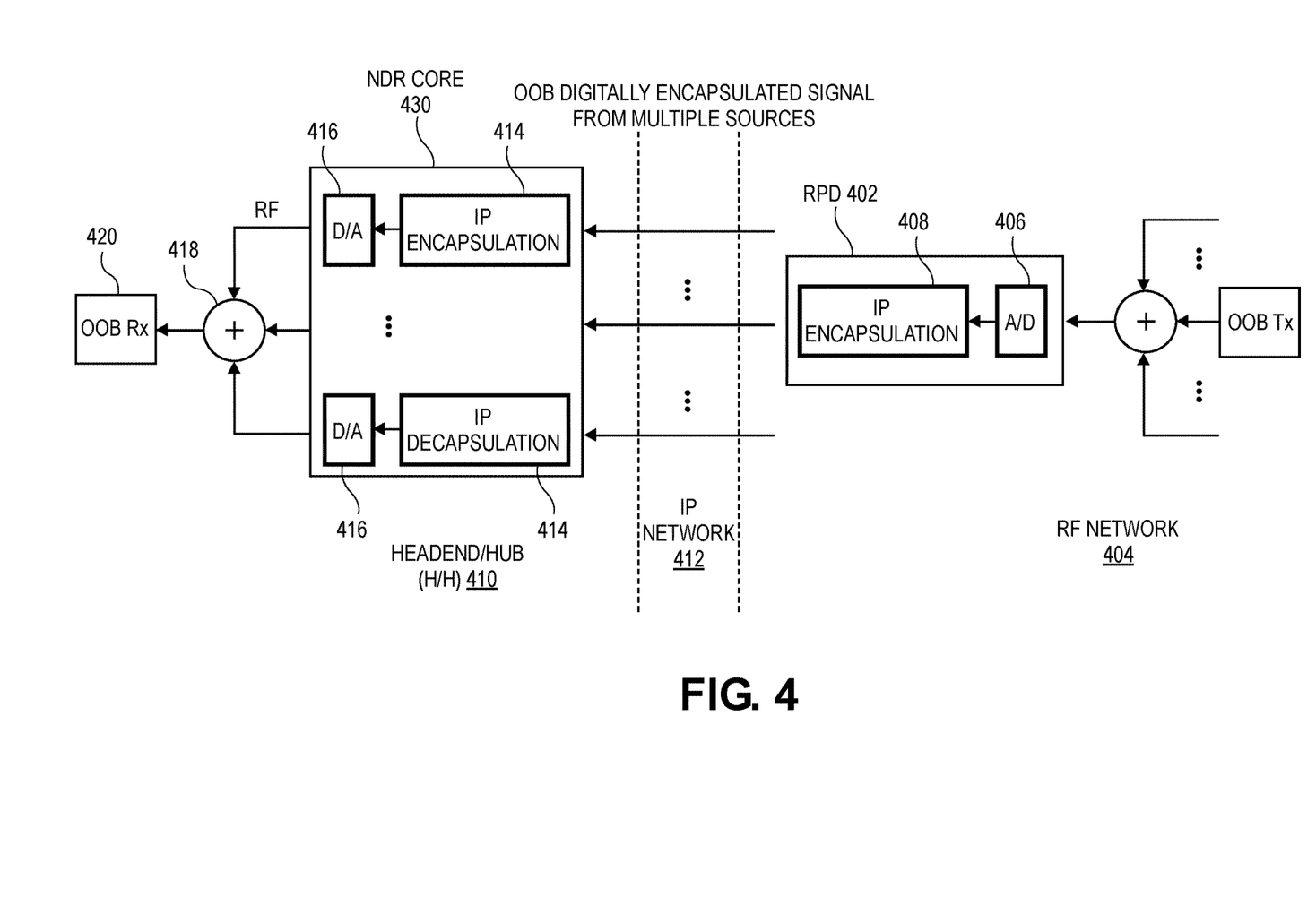
FIG. 4 is an illustration of the newly evolving distributed cable network upon which an embodiment of the invention may be employed.

FIG. 4 is an illustration of a newly evolving type of distributed cable network upon which an embodiment of the invention may be employed. As shown in FIG. 4, the link to the headend/hub (H/H) 410 is no longer analog but digital by way of an Internet Protocol (IP) network 412. This is enabled by the use of a Remote PHY-Device (RPD) in RF network 404. Within RPD 402, the OOB narrowband signal is digitized by an analog-to-digital converter (A/D) 406, encapsulated by IP encapsulation module 408, and sent through IP network 412 to H/H 410. At H/H 410, each digital stream is separately decapsulated by an IP decapsulation module 414 and separately reconstructed back to an analog signal by an digital-to-analog (D/A) converter 416. Thereafter, the OOB analog signals are combined (418) and input to OOB receiver 420. At H/H 410, the processes of IP encapsulation and digital-to-analog conversion may be performed by one or many physical devices that are each referred to as a NDR core, such as NDR core 430 shown in FIG. 4. Given the high number of OOB analog signals which must be processed, typical implementations of the approach depicted in FIG. 4 involve a large number of NDR cores 430.

One Device Supporting a NDR Channel for Many PHY Devices

Figure 5:
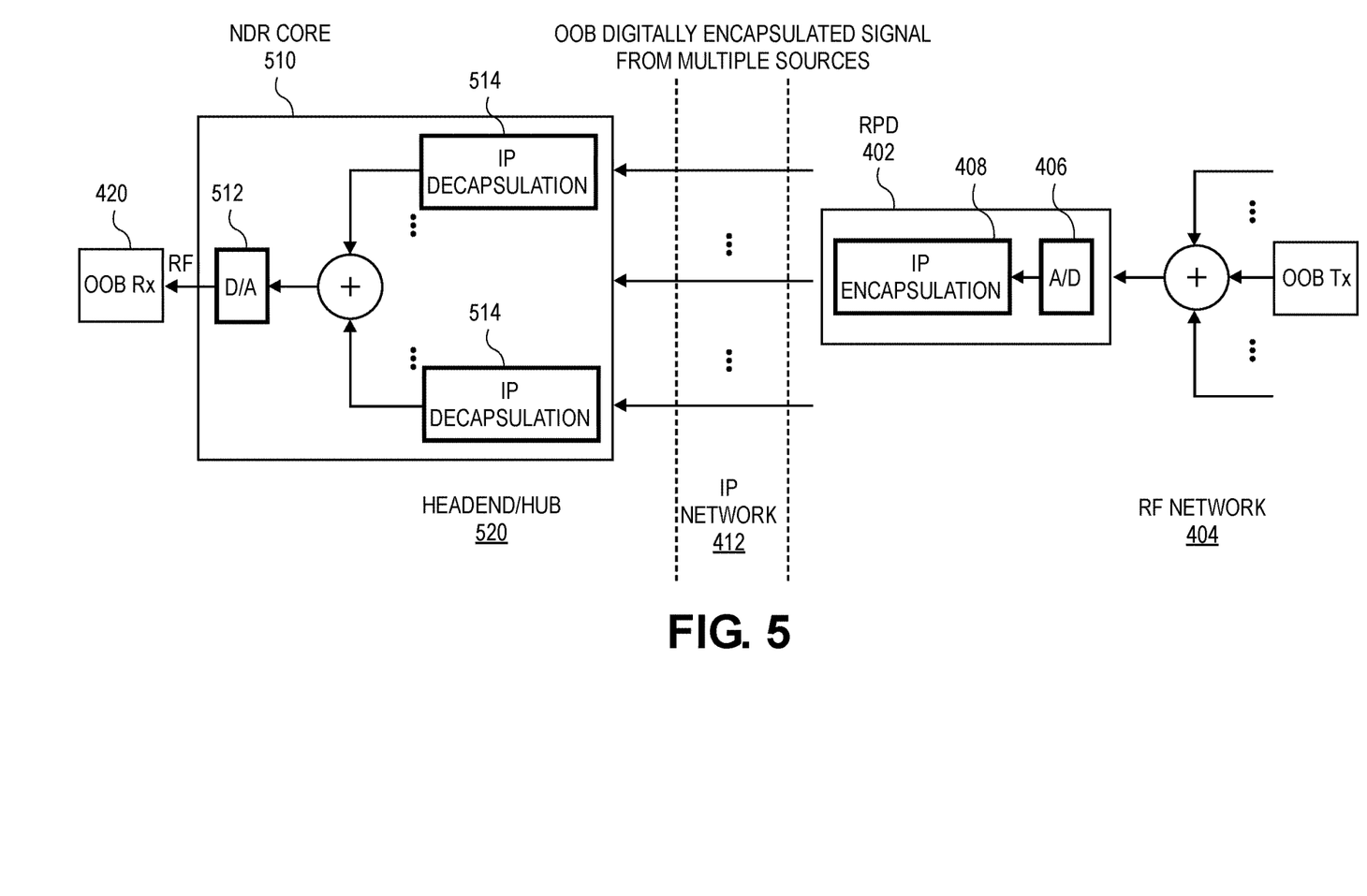
FIG. 5 is an illustration of a unified narrowband digital return (NDR) core in accordance with an embodiment of the invention.

FIG. 5 is an illustration of a unified narrowband digital return (NDR) core 510 in accordance with an embodiment of the invention. Unified NDR core 510 may be implemented in a single physical device constructed using hardware and software. Unified NDR core 510 shown in FIG. 5 performs signal summation into the digital domain and conversion of the combined signal to analog by a single digital-to-analog (D/A) converter 512. Advantageously, unified NDR core 510 reduces the number of required digital-to-analog (D/A) converters to only one, e.g., unified NDR core 510 of FIG. 5 comprises a single (D/A) converter 512 while the NDR core 430 shown in FIG. 4 relies upon multiple (D/A) converter 416.

Unified NDR core 510 also comprises a plurality of IP decapsulation modules 514 which receive packets sent over Internet Protocol (IP) network 412 by one or more RPD 402. Advantageously, unified NDR core 510 does not require any adjustment or equipment change to the existing architecture depicted in FIG. 4, as IP network 412, RF network 404, and OOB receiver 420 remain unchanged between FIG. 4 and FIG. 5. Advantageously, this allows unified NDR core 510 to be adopted without largescale financial investment.

Unified NDR core 510 of FIG. 5 is intended to be physically located at a cable headend or hub, e.g., FIG. 5 depicts unified NDR core 510 residing at cable headend or hub 520.

A typical OOB system will include more than just one OOB signal. Usually, up to three types of OOB narrowband signals are located in the return path spectrum. To that end, a unified NDR core of an embodiment can support not only one NDR channel as shown in FIG. 5, but any number (N) of NDR channels per RPD upstream port as shown in the illustration of FIG. 6.

A typical system will include a large plurality of RPDs. While FIG. 6 depicts two RPDs, namely RPD 602 and 604, it should be apparent to those of ordinary skill in the art that the following explanation of unified NDR core 680 supporting any number (N) of NDR channels per RPD upstream port of RPD 602 may be used vis-à-vis a multitude of RPDs.

Figure 6:
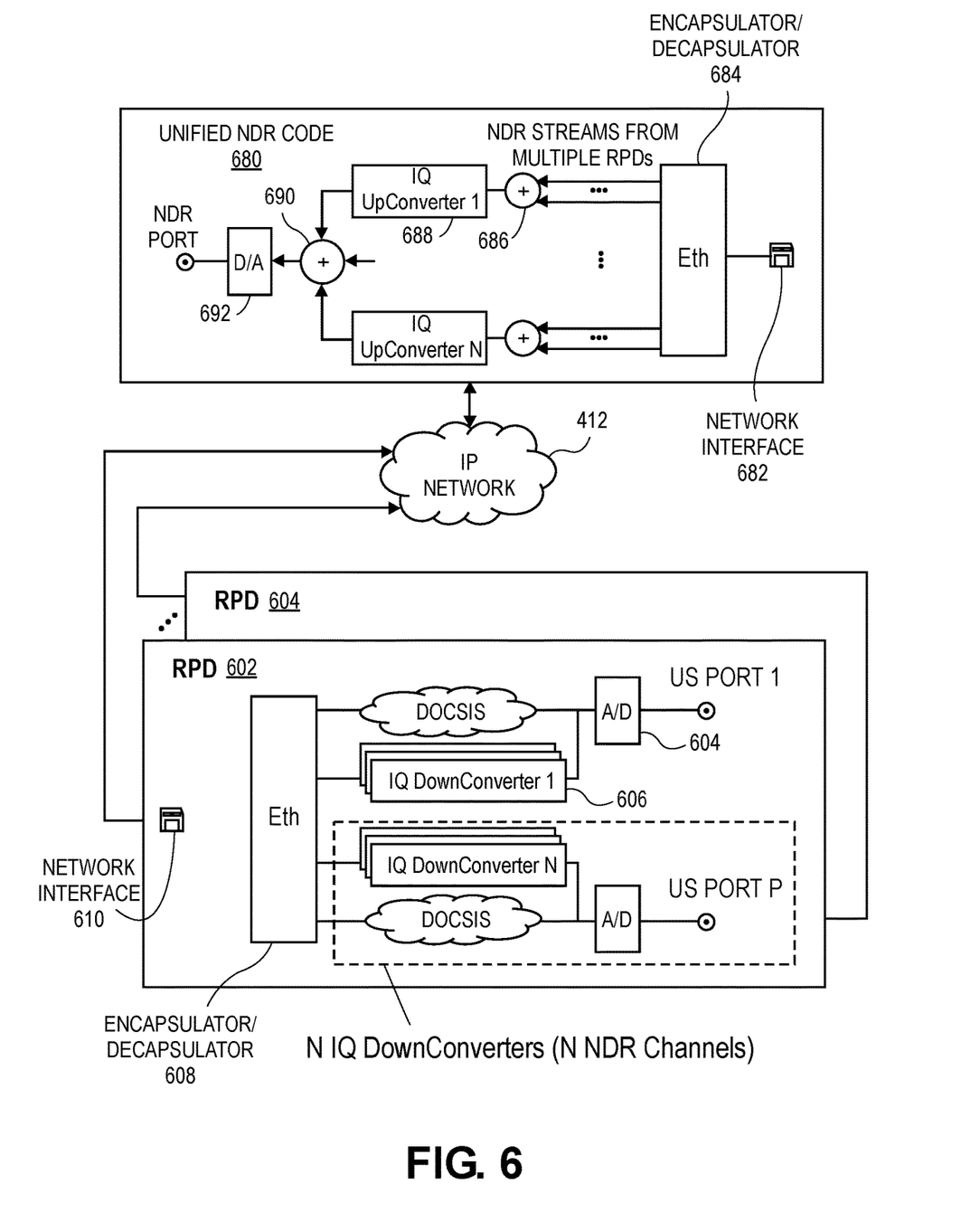
FIG. 6 is an illustration of a RPD that supports N NDR channels per RPD upstream port in accordance with an embodiment of the invention.

At RPD 602 of FIG. 6, a OOB signal is received from a OOB transmission source (such as a computer or television) at an upstream port, such as US Port 1. The OOB signal is propagated from the upstream port to an analog to digital converter, e.g., the OOB signal may be propagated from US Port 1 to analog to digital converter (A/D) 604. Thereafter, RPD 602 downconverts the OOB signal at downconverter 606 before encapsulating the downconverted OOB signal at encapsulator/decapsulator 608 and transmitting the encapsulated OOB signal on IP network 412 at network interface 610.

Once the digital packets transmitted over IP network 412 are received by unified NDR core 680, the packets are received at network interface 682. From there, the received packets are processed by encapsulator/decapsulator 684, which removes the contents from the received packets. To support each of the N supported OOB channels, unified NDR core 680 employs a digital summation device 686, an upconverter 688, and a final digital summation 690. The output of final digital summation device 690 includes N OOB narrowband channels that are each positioned at the desired center frequency. The output of final digital summation device 690 is supplied to digital to analog converter 692, which synthesizes the RF signal carrying the N OOB channels. The output of the unified NDR core 680 (which is not shown in FIG. 6) may now be supplied to N OOB receiver systems by using analog RF splitters.

Selective Handing Based on Noise Transmission

One of the main limits of the return path density is noise funneling of upstream noise. In the downstream path, the signal is distributed to different end points (e.g. homes, line amplifiers, and the like) by splitting the signal. However, in the return path, the signals which originate from all served end points and sent to the headend/hub are combined as shown in FIG. 5 and FIG. 6. Unfortunately, in this process, it is not only the signals that are combined, but the unwanted noise originating from each end point as well.

Generally (for non-correlated noise elements), the combined signal to noise ratio (SNR) is degraded as a function of 10*log 10(M) [dB], where M is the number of combined RPD signals into one OOB receiver (OOB-Rx). For example, assuming that the SNR from one RPD equals 25 dB, and OOB signals from 10 RPDs are combined. The resulting SNR equal 15 dB. As a result, the OOB receiver might suffer degraded performance with such a low SNR.

Embodiments of the invention are meant to be employed in a distributed digital network, and the use of a digital signal combiner by the unified NDR core of an embodiment yields the opportunity to increase the number of served RPDs thereby. However, the impact to the SNR when combining more OOB signals from a plurality of RPDs must still be addressed. As mentioned before, it is a common practice that only one or very few OOB sources transmit at the same time (for example the Aloha protocol or other centralized transmission grant approach may be employed).

Figure 7:
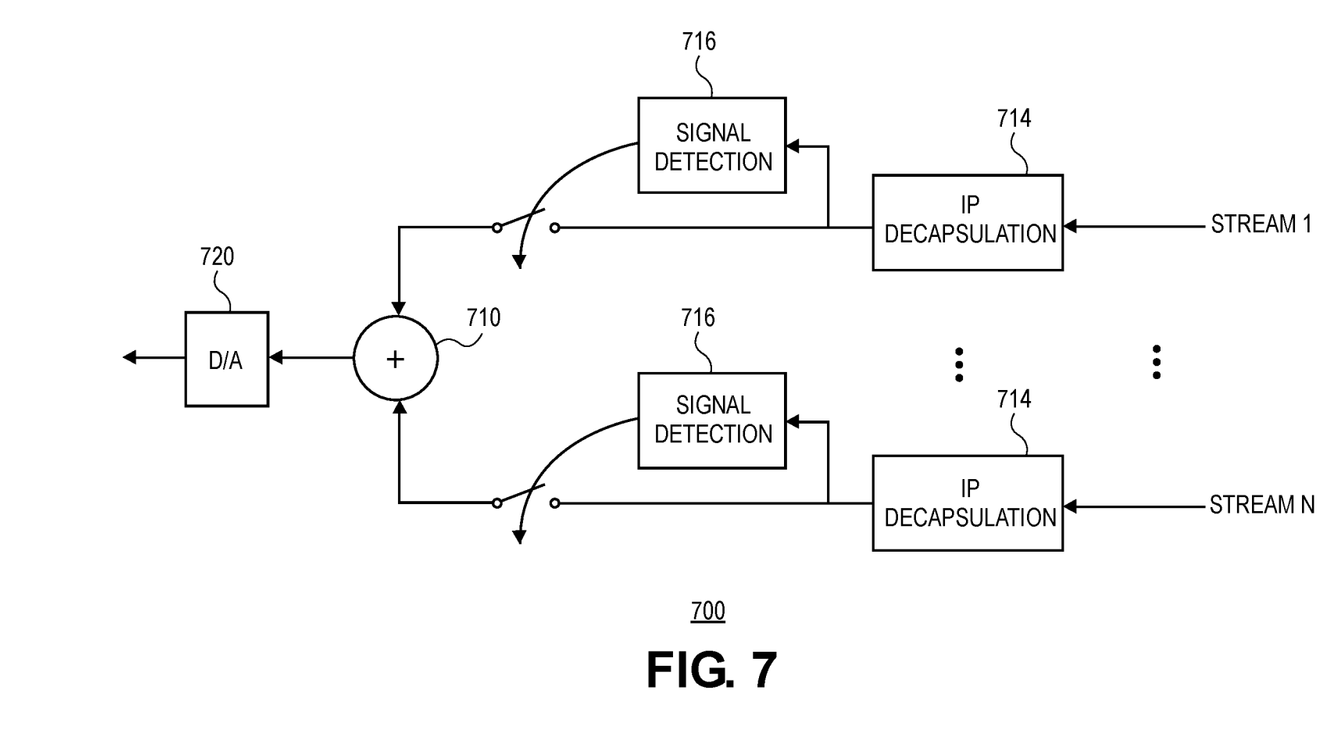
FIG. 7 is an illustration of a signal-detection element that may be added within the NDR core to reduce the noise funneling in accordance with an embodiment of the invention.

Embodiment of the invention employ a different approach for addressing noise funneling than the prior art. FIG. 7 is an illustration of a signal-detection module 700 that may be added within a unified NDR core to reduce the noise funneling in accordance with an embodiment of the invention. After a stream undergoes IP decapsulation at IP decapsulation 714, a signal detection element 716 determines whether the stream is carrying unwanted noise or an intended signal.

A stream which is identified as noise-only for a period of time T_Period is blocked from the summation element 710 by signal detection element 716. In this way, the combined signals from 100 RPDs may yield only 5 dB of SNR if the SNR from each RPD signal is 25 dB and using a simple combiner, while the combined SNR will hardly be degraded when adding signal detection elements 716.

Figure 8:
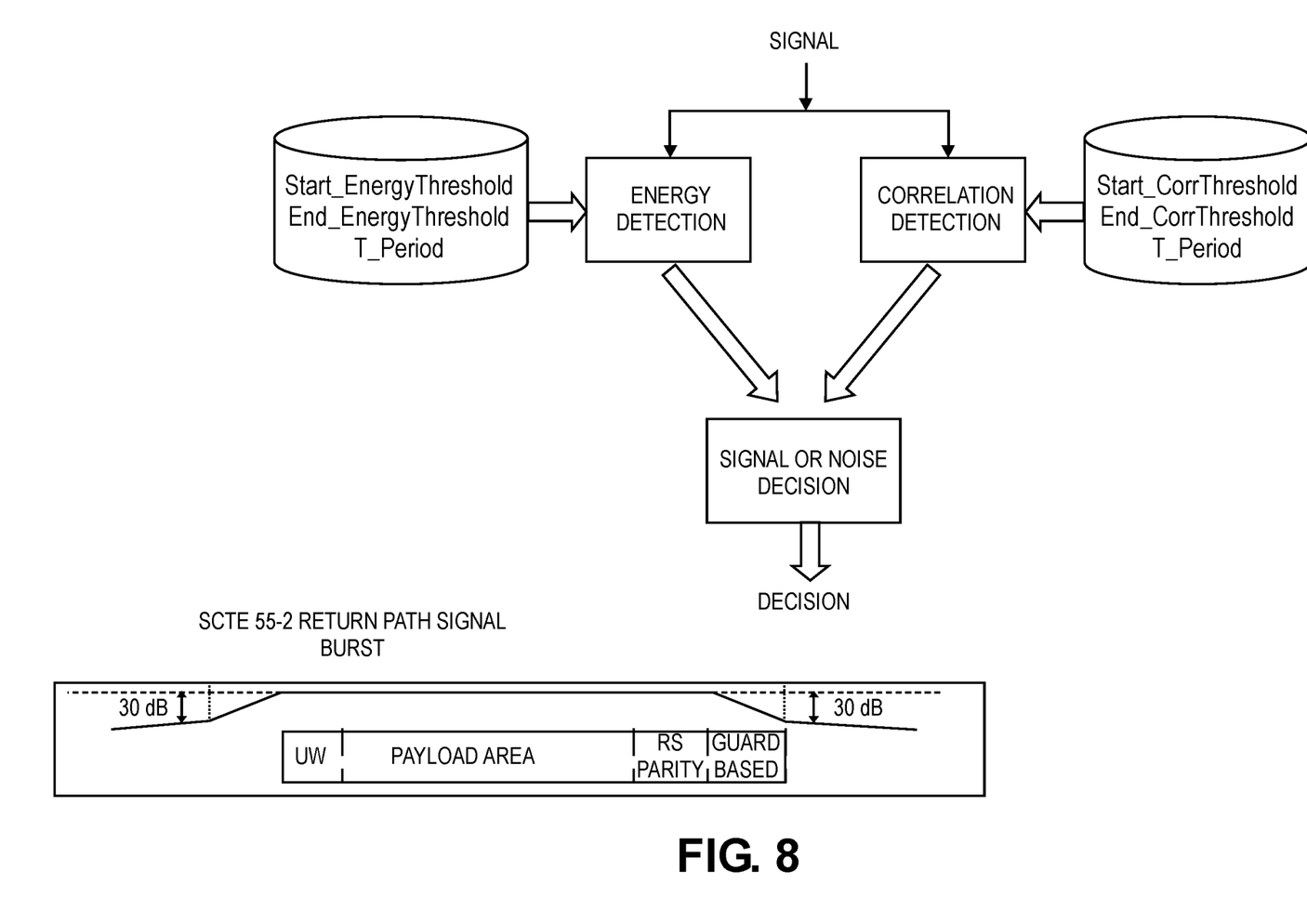
FIG. 8 is a diagram of options for performing signal or noise determination that may be performed by a signal detection element in accordance with an embodiment of the invention.

As shown in FIG. 7, single DAC 720 receives as input only data from those remote PHY devices determined by the signal detection element 716 to be presently transmitting signal, rather than a noise, in the narrowband digital return (NDR) channel FIG. 8 is a diagram of options for performing signal or noise determination that may be performed by signal detection element 716 in accordance with an embodiment of the invention. The operation of signal detection element 716 may identify an active OOB signal during period T_Period by comparing the input stream energy or the smoothed (low pass filtered) version of the stream energy to a set of thresholds. For example, signal detection element 716 may detect an energy rise in the input stream using a comparator with a threshold associated with an expected energy rise and may detect an energy fall in the input stream using a comparator with a threshold associated with an expected energy fall.

Such a detection approach yields a good noise reduction factor for the NDR combiner when the dominating noise is characterized as white-noise. However, when the dominating noise elements are impulsive-noise, using threshold values in detecting noise is less optimal and may fail to properly detect the noise.

Assume that an impulsive noise environment from each RPD which statistically cause a 1% Packet Error Rate (or any other measurable fail rate) at the OOB receiver. In other words, that if only one RPD source is supplied to the OOB receiver, the percent chance that an error will occur at the OOB receiver will equal 1%. This attribute will be named PER_ONE_RPD, equal to 1% in this example. When some number M RPDs NDR sources are combined, the approximated Packet Error Rate will be degraded to an unacceptable M %.

Fortunately, characteristics of OOB signals are well-known and can be explicitly detected without the aid of a "full receiver" (i.e., part of OOB receiver functionality). For example, an example of a well-known OOB signal is a SCTE-55-2 OOB signal. A SCTE-55-2 signal burst starts with a well-known pattern named Unique Word (UW). A correlation operation may be performing against a signal with the UW pattern to determine whether the signal is a SCTE-55-2 OOB signal. Simulation results show a 100% hit ratio of the 55-2 signal detection while keeping the false detection rate due to impulse noise events at very low figures (<5%). If the false detection rate due to impulse noise equals 5%, then the approximate Packet Error Rate after combing of M RPD sources will equal 0.05*M*PER_ONE_RPD which is still reasonable false rate for the OOB receiver.

Buffering

A unified NDR core stores and processes OOB signals received from RPDs before sending the results of processing the OOB signals to a OOB receiver. The unified NDR core plays out processed OOB signals to the OOB receiver at a fixed rate. For this reason, the rate at which OOB signals are received from RPDs must provide for the First In First Out (FIFO) buffers in the unified NDR core to not overflow or underrun.

Figure 9:
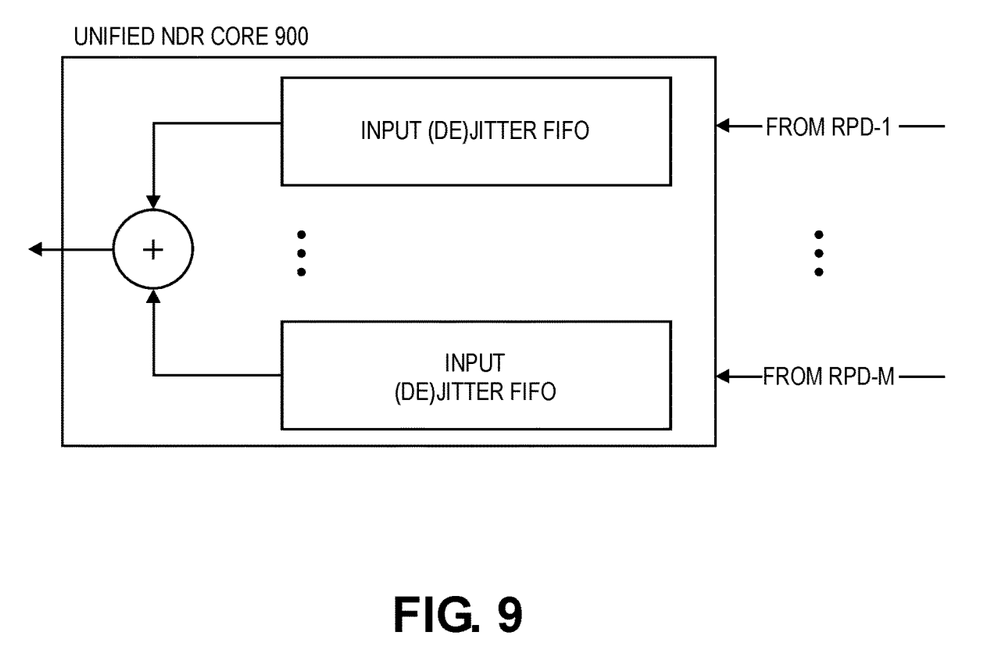
FIG. 9 is a illustrative block diagram of a unified NDR core with a (de)jitter FIFO buffer per NDR channel stream from an RPD in accordance with an embodiment of the invention.

A FIFO buffer used by a unified NDR core is also named the (De)Jitter buffer. FIG. 9 is a illustrative block diagram of unified NDR core 900 with Input (De)jitter FIFO per NDR channel stream from an RPD in accordance with an embodiment of the invention. The value of the jitter buffer threshold and in the NDR core will be determined by the jitter contribution of both the RPD and the IP network. The R-PHY specification explicitly requires that the NDR buffering support the maximum network jitter. Moreover, the unified NDR core must have sufficient NDR buffering to support the timing requirements specified in the Data-Over-Cable Service Interface Specifications DCA—MHAv2, Remote DOCSIS Timing Interface, CM-SP-R-DTI-I07-180509.

Assume that the NDR signal sampling rate is 5.12 Msps, the number of combined RPD signals is M=100, and the required (De)Jittering at the unified NDR core is 1 msec. As a result, the minimum required input FIFO buffer size to hold the 20 bits I/Q samples stream from each RPD is equal to 20 bits*5.12M*1 m=12.8 kB. The total required RAM for all input FIFOs is equal 100×12.8 kB=1.28 MB.

Figure 10:
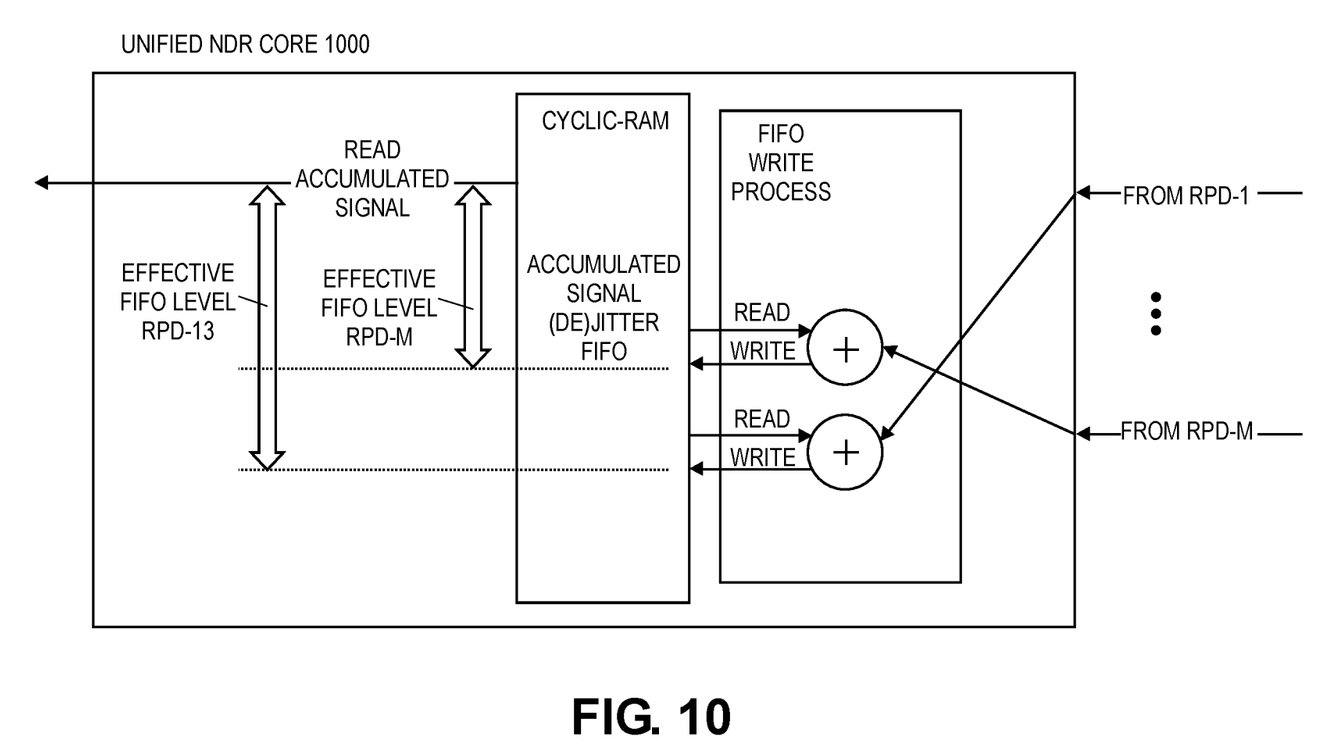
FIG. 10 is a block diagram of a unified NDR core comprising a (de)jitter buffer that buffers the accumulated signal instead of the input signal in accordance with an embodiment of the invention.

In order to reduce the required RAM size of the (de)Jitter buffer by a factor of M, embodiments of the invention buffer the accumulated signal instead of the input signal. FIG. 10 is a block diagram of a unified NDR core 1000 comprising a (de)jitter buffer that buffers the accumulated signal instead of the input signal in accordance with an embodiment of the invention. The accumulated signal is in fact the evolving summation signal.

The IP packets carrying the NDR digitized signals from the M RPDs are received serially by the Ethernet port of the unified NDR device (e.g., 10 Gbps I/F). At initialization time, the cyclic-RAM depicted in FIG. 10 stores dummy or zero values. Each NDR source is handled with a 'write pointer' into the cyclic-RAM. The total sample rate (10 bits I/Q words) at the input to the cyclic-RAM is M*NDR_CHANNEL_RATE, where NDR_CHANNEL_RATE can be for example 5.12 Msps. The output from the cyclic-RAM and into the DAC is NDR_CHANNEL_RATE. Consequently, the summation process is done into the cyclic-RAM.

A "read pointer" address is cyclically incremented within the cyclic-RAM address space at the rate of NDR_CHANNEL_RATE. Thus, at the rate of NDR_CHANNEL_RATE, the value stored in the cyclic-RAM is read and delivered to the D/A. The value read from the cyclic-read is depicted in FIG. 10 as "Read Accumulated Signal." Immediately after this value is read from the cyclic-RAM, the same cyclic-RAM entry at address "read pointer" is assigned a zero or default value.

A new NDR stream (e.g., from a RPD) received at the unified NDR core is flagged with "welcome flag" and it's "write_pointer(m)" is positioned FIFO_LEVEL words leading the "read_pointer". The sample rate of this stream is NDR_CHANNEL_RATE. Per each input sample from this stream, the cyclic-RAM is read at address "write_pointer (m)," and the read value is summed with the input sample and immediately stored into the RAM at the same "write_pointer(m)". The arithmetic of the process is depicted within the subblock named "FIFO write process" in FIG. 10. The "write_pointer(m) address is incremented at an average rate of NDR_CHANNEL_RATE. The short term rate is not equal to the average rate since the input IP stream arrives with jitter. The average distance between the "read_pointer" and the "write_pointer(m)" is approximately FIFO_LEVEL. Therefore, the latency added by the cyclic-RAM is approximately FIFO_LEVEL multiplied by NDR_CHANNEL_RATE.

Every new NDR stream follows the same process that starts with the assignment of the "welcome flag". Eventually all write pointers, "write_pointer(m)", where m={1 to M}, are leading by approximately FIFO_LEVEL before the "read_pointer". The values stored in the cyclic-RAM are the accumulated NDR signals. Since the "read_pointer" is lagging at a safe distance (i.e., a distance larger than the amount of input jitter) from all the write pointers, until a value read by from the "read_pointer" address the cyclic-RAM entry already equal to the sum of all NDR channels. In other words, each channel has already "visited" that address and accumulated its relevant sample into the cyclic-RAM.

Advantageously, the approach depicted in FIG. 10 and explained above provides the same (de)Jitter FIFO effective time per input stream as shown in FIG. 9 even though only one physical FIFO (the cyclic-RAM) is employed.

The size of the cyclic-RAM in FIG. 10 is not reduced exactly by a factor of M compared to the state-of-the-art. When using a FIFO buffer at the input level per stream, each entry is a NDR sample of 20 bits (I and Q). In contrast, the proposed cyclic-RAM of an embodiment stores the accumulated signal. Simulations show that by using '2s complement arithmetic' within the 'FIFO write process', extending the I and Q to 16 bits+16 bits provides excellent results (i.e., no intermediate clipping). The I/Q value read from the RAM read-side, is truncated to 10 bits I and 10 bits Q and delivered to the D/A. As a result, the cyclic-RAM size reduction factor of an embodiment is: 1/M*16/10=1.6/M.

In an embodiment, the cyclic-RAM access speed is a limiting factor of the design due to the read-accumulate-write performed by the 'FIFO write process' depicted by FIG. 10. This limit is due to the latency between (a) a read request until the value is available at the cyclic-RAM data-bus, and (b) the additional latency of the ADD operation. This latency may be addressed by using a small lag between read and write addresses within the 'FIFO write process'. When dealing with RPD-m, the read operation address equals "write_pointer(m)"+D, where D is small, e.g., as 3 or 4, while the write address equal "write_pointer (m)". This small amount of lag allows the read-accumulate-write to be performed without any latency using the hardware pipelined architecture.

In an embodiment, the 'FIFO write process' can be parallelized in a hardware implementation that performs P parallel read-accumulate-write' for P new input samples from the same IP packet. In a further embodiment, the read-accumulate process can be parallelized in a hardware implementation that performs Q parallel sample read operations at the same hardware clock cycle.

Further Embodiments

Figure 11:
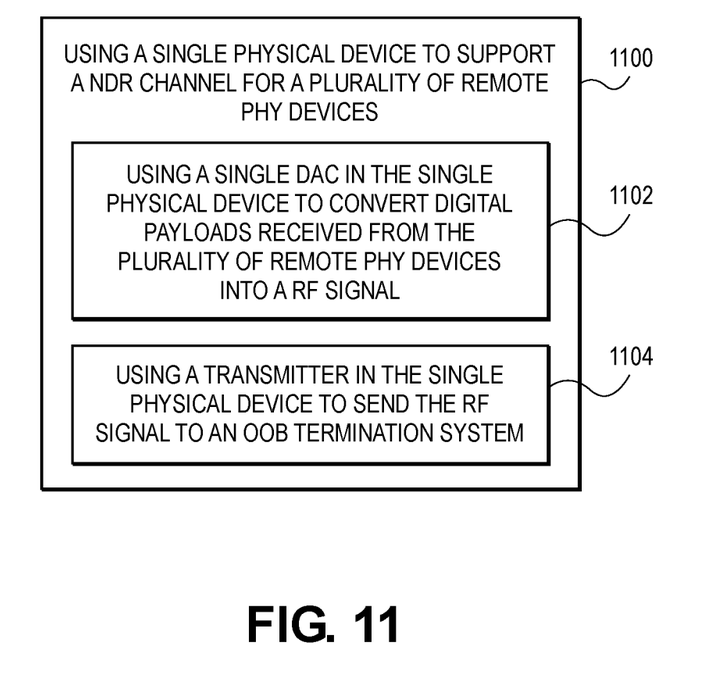
FIG. 11 is a flowchart illustrating the process of employing a single hardware device that supports a narrowband digital return (NDR) channel for a plurality of remote PHY devices in accordance with an embodiment of the invention.

FIG. 11 is a flowchart illustrating the process 1100 of employing a single hardware device that supports a narrow-band digital return (NDR) channel for a plurality of remote PHY devices in accordance with an embodiment of the invention. In step 1102, using any of the techniques or approaches discussed herein, a single digital-to-analog converter (DAC) converts digital payloads carried by digital packets received from the plurality of Remote PHY devices into a RF signal. In step 1104, using any of the techniques or approaches discussed herein, a transmitter for sending the RF signal to an Out-of-Band (00B) Termination System.

Figure 12:
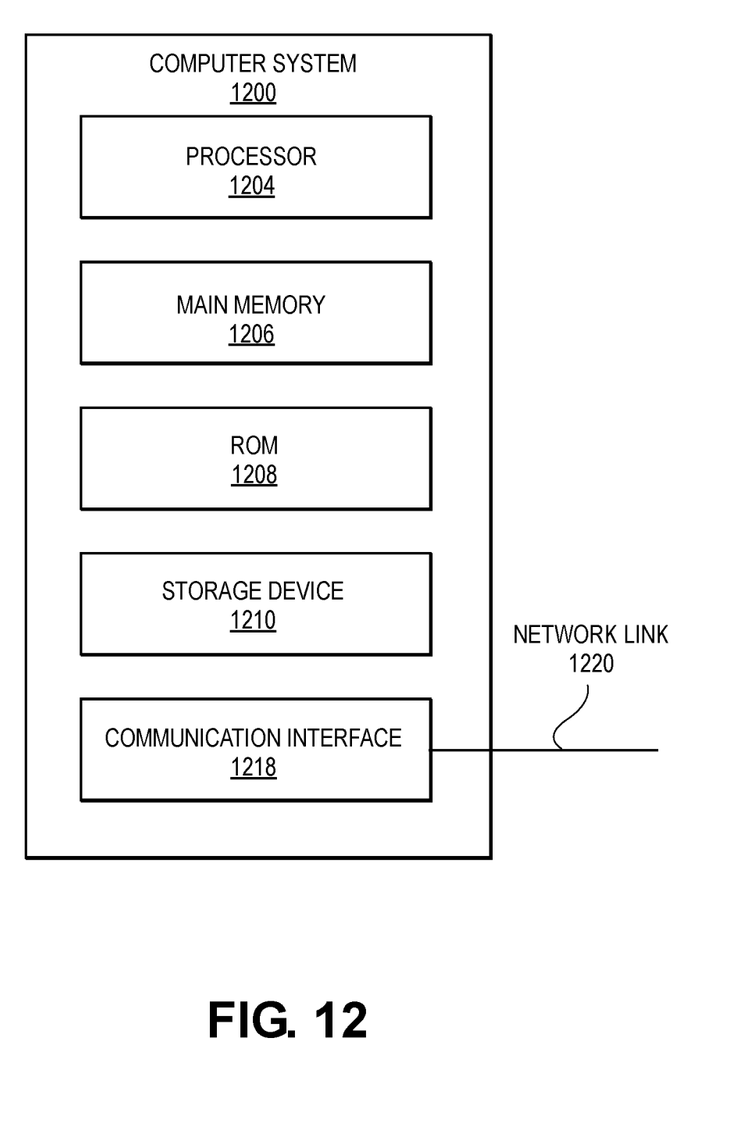
FIG. 12 is a block diagram that illustrates a computer system which may be used to perform the process of FIG. 11 or implement, in whole or in part, an embodiment of the invention.

FIG. 12 is a block diagram that illustrates a computer system 1200 which may be used to perform process 1100 or implement, in whole or in part, an embodiment of the invention. In an embodiment, computer system 1200 includes processor 1204, main memory 1206, ROM 1208, storage device 1210, communication interface 1218, and communications bus 1230. Computer system 1200 includes at least one processor 1204 for processing information. Computer system 1200 also includes a main memory 1206, such as a random access memory (RAM) or other dynamic storage device, for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device for storing static information and instructions for processor 1204. A storage device 1210, such as a magnetic disk or optical disk, is provided for storing information and instructions.

Embodiments of the invention are related to the use of computer system 1200 for implementing the techniques described herein. According to one embodiment of the invention, those techniques are performed by computer system 1200 in response to processor 120 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 1204 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a network link 1220 to computer system 1200.

Communication interface 1218 provides a two-way data communication coupling to a network link 1220 that is connected to a local network. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links or optical links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through a network to one or more other computer systems.

Computer system 1200 can send messages and receive data, including program code, through the network(s), network link 1220 and communication interface 1218. For example, a server might transmit a requested code for an application program through the Internet, a local ISP, a local network, subsequently to communication interface 1218. The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for communicating with a plurality of Remote PHY devices, comprising:
    a single hardware device for supporting a narrowband digital return (NDR) channel for the plurality of remote PHY devices, comprising:
        a single digital-to-analog converter (DAC) which converts digital payloads carried by digital packets received from the plurality of Remote PHY devices into a RF signal;
        a transmitter for sending the RF signal to an Out-of-Band (OOB) Termination System; and
        a hardware component operable to process an unprocessed or processed version of input stream energy from each of the plurality of remote PHY devices to determine which of the plurality of remote PHY devices are transmitting a signal rather than noise, wherein the single DAC receives as input only digital payloads sent from remote PHY devices that are deemed to be transmitting a signal rather than noise.

2. The apparatus of claim 1, wherein the single hardware device is located within a cable headend.

3. The apparatus of claim 1, wherein the single hardware device comprises a plurality of IP decapsulation modules which receives a plurality of packets sent over an Internet Protocol (IP) network by the plurality of Remote PHY devices.

4. The apparatus of claim 1, wherein the single hardware device supports a plurality of narrowband digital return (NDR) channels for the plurality of remote PHY devices.

5. The apparatus of claim 1, wherein the single DAC receives as input only data sent from a set of remote PHY devices determined to be presently transmitting signal, rather than a noise, in the narrowband digital return (NDR) channel.

6. The apparatus of claim 1, wherein the single DAC receives as input only digital payloads sent from remote PHY devices that are deemed to be transmitting a signal rather than noise.

7. The apparatus of claim 1, wherein the hardware component processes the unprocessed or the processed version of the input stream energy from each of the plurality of remote PHY devices by comparing the input stream energy to a set of one or more thresholds to determine which of the plurality of remote PHY devices are transmitting a signal rather than noise.

8. The apparatus of claim 1, wherein the hardware component processes the unprocessed or the processed version of the input stream energy from each of the plurality of remote PHY devices by comparing the input stream energy to a set of one or more patterns to determine which of the plurality of remote PHY devices are transmitting a signal rather than noise.

9. The apparatus of claim 1, wherein the digital packets received from the plurality of Remote PHY devices are not buffered in a plurality of buffers that are each associated with a different member of the plurality of Remote PHY devices, and wherein the packets received from the plurality of Remote PHY devices are buffered in a singular buffer which holds an accumulated signal received from the plurality of Remote PHY devices.

10. One or more non-transitory computer-readable storage mediums storing one or more sequences of instructions for communicating with a plurality of Remote PHY devices, which when executed, cause:
    a single hardware device for supporting a narrowband digital return (NDR) channel for the plurality of remote PHY devices, comprising:
        a single digital-to-analog converter (DAC) which converts digital payloads carried by digital packets received from the plurality of Remote PHY devices into a RF signal;

a transmitter for sending the RF signal to an Out-of-Band (OOB) Termination System;

a hardware component operable to process an unprocessed or processed version of input stream energy from each of the plurality of remote PHY devices to determine which of the plurality of remote PHY devices are transmitting a signal rather than noise, wherein the single DAC receives as input only digital payloads sent from remote PHY devices that are deemed to be transmitting a signal rather than noise.

11. The one or more non-transitory computer-readable storage mediums of claim 10, wherein the single hardware device is located within a cable headend.

12. The one or more non-transitory computer-readable storage mediums of claim 10, wherein the single hardware device comprises a plurality of IP decapsulation modules which receives a plurality of packets sent over an Internet Protocol (IP) network by the plurality of Remote PHY devices.

13. The one or more non-transitory computer-readable storage mediums of claim 10, wherein the single hardware device supports a plurality of narrowband digital return (NDR) channels for the plurality of remote PHY devices.

14. The one or more non-transitory computer-readable storage mediums of claim 10, wherein the single DAC receives as input only data sent from a set of remote PHY devices determined to be presently transmitting signal, rather than a noise, in the narrowband digital return (NDR) channel.

15. The one or more non-transitory computer-readable storage mediums of claim 10, wherein the single DAC receives as input only digital payloads sent from remote PHY devices that are deemed to be transmitting a signal rather than noise.

16. The one or more non-transitory computer-readable storage mediums of claim 10, wherein the hardware component processes the unprocessed or the processed version of the input stream energy from each of the plurality of remote PHY devices by comparing the input stream energy to a set of one or more thresholds to determine which of the plurality of remote PHY devices are transmitting a signal rather than noise.

17. The one or more non-transitory computer-readable storage mediums of claim 10, wherein the hardware component processes the unprocessed or the processed version of input stream energy from each of the plurality of remote PHY devices by comparing the input stream energy to a set of one or more patterns to determine which of the plurality of remote PHY devices are transmitting a signal rather than noise.

18. The one or more non-transitory computer-readable storage mediums of claim 10, wherein the digital packets received from the plurality of Remote PHY devices are not buffered in a plurality of buffers that are each associated with a different member of the plurality of Remote PHY devices, and wherein the packets received from the plurality of Remote PHY devices are buffered in a singular buffer which holds an accumulated signal received from the plurality of Remote PHY devices.

19. A method for communicating with a plurality of Remote PHY devices, comprising:

a single hardware device supporting a narrowband digital return (NDR) channel for the plurality of remote PHY devices by performing:

a single digital-to-analog converter (DAC), comprised within said single hardware device, converting digital payloads carried by digital packets received from the plurality of Remote PHY devices into a RF signal, a transmitter, comprised within said single hardware device, sending the RF signal to an Out-of-Band (OOB) Termination System, and a hardware component processing an unprocessed or processed version of input stream energy from each of the plurality of remote PHY devices to determine which of the plurality of remote PHY devices are transmitting a signal rather than noise, wherein the single DAC receives as input only digital payloads sent from remote PHY devices that are deemed to be transmitting a signal rather than noise.

20. The method of claim 19, wherein the single hardware device is located within a cable headend.

21. The method of claim 19, wherein the single hardware device comprises a plurality of IP decapsulation modules which receives a plurality of packets sent over an Internet Protocol (IP) network by the plurality of Remote PHY devices.

22. The method of claim 19, wherein the single hardware device supports a plurality of narrowband digital return (NDR) channels for the plurality of remote PHY devices.

23. The method of claim 19, wherein the single DAC receives as input only data sent from a set of remote PHY devices determined to be presently transmitting signal, rather than a noise, in the narrowband digital return (NDR) channel.

24. The method of claim 19, wherein the single DAC receives as input only digital payloads sent from remote PHY devices that are deemed to be transmitting a signal rather than noise.

25. The method of claim 19, wherein the hardware component processes the unprocessed or the processed version of input stream energy from each of the plurality of remote PHY devices by comparing the input stream energy to a set of one or more thresholds to determine which of the plurality of remote PHY devices are transmitting a signal rather than noise.

26. The method of claim 19, wherein the hardware component processes the unprocessed or the processed version of input stream energy from each of the plurality of remote PHY devices by comparing the input stream energy to a set of one or more patterns to determine which of the plurality of remote PHY devices are transmitting a signal rather than noise.

27. The method of claim 19, wherein the digital packets received from the plurality of Remote PHY devices are not buffered in a plurality of buffers that are each associated with a different member of the plurality of Remote PHY devices, and wherein the packets received from the plurality of Remote PHY devices are buffered in a singular buffer which holds an accumulated signal received from the plurality of Remote PHY devices.

* * * * *